Figure 3:
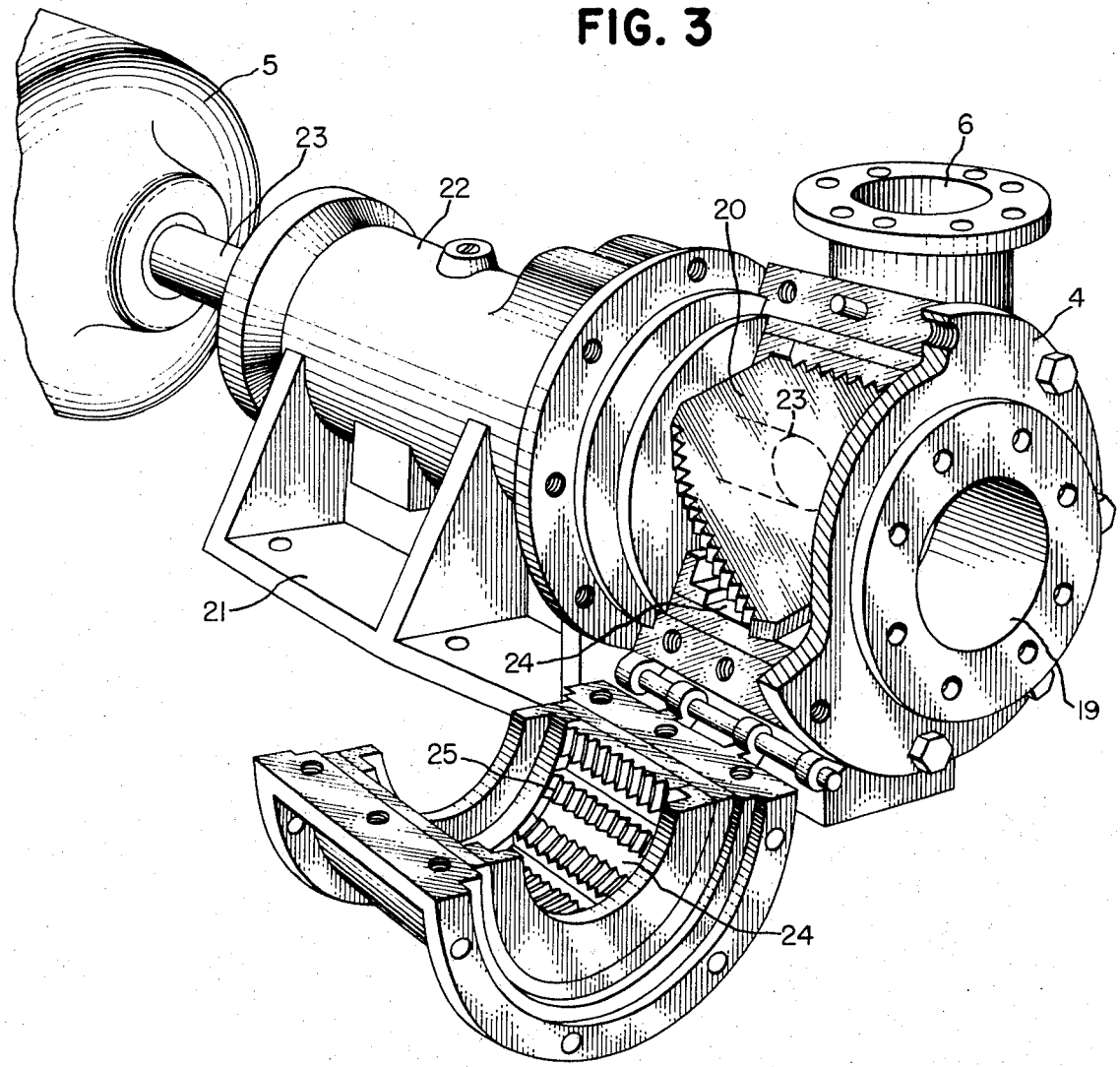

United States Patent [19]
Campbell et al.

[11] 3,862,103
[45] Jan. 21, 1975

[54] METHOD OF RECOVERING POLYMER FROM ITS SOLUTION

[75] Inventors: Everett W. Campbell, League City, Tex.; Carl E. Traina, Uniontown, Ohio

[73] Assignee: The Goodyear Tire & Rubber Company, Akron, Ohio

[22] Filed: Nov. 30, 1973

[21] Appl. No.: 420,750

Related U.S. Application Data

[63] Continuation of Ser. No. 192,933, Oct. 27, 1971, which is a continuation of Ser. No. 854,489, Sept. 2, 1969, abandoned.

[52] U.S. Cl....... 260/94.7 R, 260/85.3 R, 260/88.7, 260/88.2 S, 260/89.5 AW, 260/91.1 S, 260/92.8 A, 260/93.7, 260/94.9 F, 260/96 R

[51] Int. Cl............................................. C08d 5/00
[58] Field of Search ......... 260/94.7 R, 93.7, 94.9 F, 260/88.7, 89.1, 92.8 A, 91.1 S

*Primary Examiner*—William F. Hamrock
*Attorney, Agent, or Firm*—F. W. Brunner; J. D. Wolfe

[57] ABSTRACT

This invention relates to an apparatus and method for obtaining dry rubber from a solvent dispersion of said polymer by simultaneously feeding a water/steam mixture and the solvent dispersion to a grinding, pumping device to achieve intimate admixture, and vaporizing at least sufficient amounts of the solvent to effect separation of the polymer as a crumb, removing the water from the crumb and drying said crumb to obtain a dry polymer.

2 Claims, 3 Drawing Figures

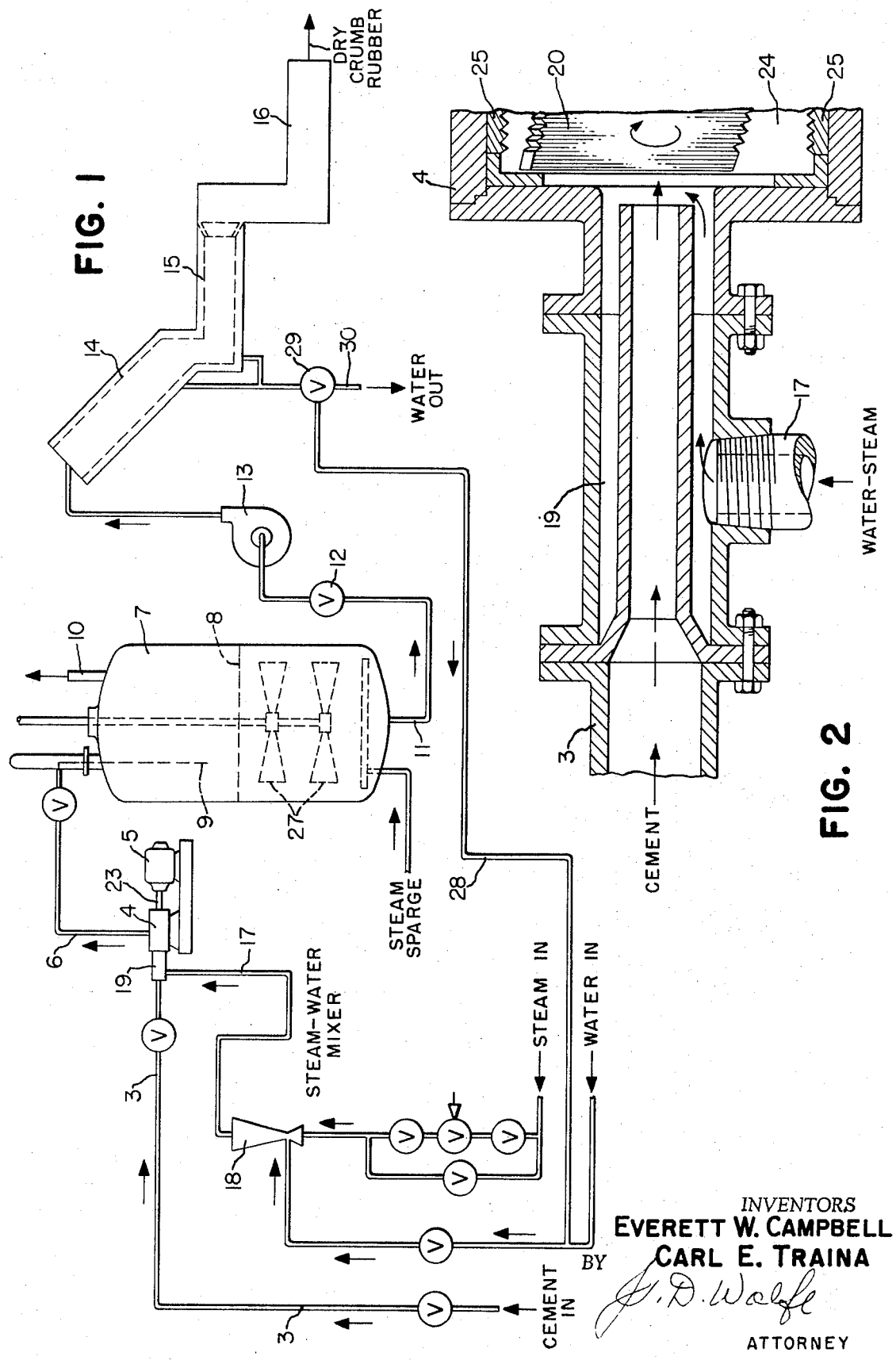

INVENTORS
EVERETT W. CAMPBELL
CARL E. TRAINA
BY
ATTORNEY

METHOD OF RECOVERING POLYMER FROM ITS SOLUTION

This is a continuation of application Ser. No. 192,933 filed Oct. 27, 1971, which was a continuation of application Ser. No. 854,489, filed Sept. 2, 1969, no abandoned.

This invention relates to a method of recovering rubber and related polymeric products from solvent solutions thereof. More particularly, this invention relates to a method of recovering polymeric materials from solvent solutions thereof in an agitation device.

Heretofore, it has been customary to coagulate or agglomerate solvent solutions of polymeric material, normally called cements, by contacting the cement with water and steam while the cement is being agitated and thereby remove part or all of the solvent to obtain the rubber in the form of a crumb in a condition that is finely divided where the rubber can be dried and packaged for shipment or used in the normal manner, namely, in bales or as a crumb. In coagulating cements with water, steam and agitation, trouble has been experienced in achieving a uniform distribution of the size of the crumb particle due to the formation of either very fine material or material that is essentially lumps that are so large the solvent is not readily removed to yield a dry polymer. Also, it should be noted that the finely divided rubber crumb is easily scorched during drying while the larger particles are not satisfactorily dried. Still other disadvantages of the prior art method of producing crumb are the extensive vibration of the crumb forming vessel and high solvent losses.

An object of this invention is to provide a method and apparatus for coagulating and recovering rubber from cement. This object and other advantages of this invention may more readily be appreciated by a reference to the drawings wherein FIG. 1 is a schematic view of the over-all apparatus and flow for achieving the results of this invention;

FIG. 2 is a detailed view through the cement, steam and water feeding device just ahead of the mixing and pumping cavitation device; and FIG. 3 is a detailed view showing the mixing and pumping cavitation device for achieving the intimate mixing or admixture of the cement and water-steam mixture while volatilizing a sufficient amount of the solvent to produce a crumb slurry.

Referring specifically to FIG. 1, numeral 3 refers to the line for feeding the cement or solvent solution of the polymer to the cavitation-attrition device 4. It should be noted that the cavitation-attrition device 4 is driven by a high speed electric motor 5 and has a discharge pipe 6 from which the coagulated cement or crumb slurry is pumped to the primary stripper separation tank 7 and is pumped into the tank slightly above the level 8 of the material within tank 7 by the leg 9 which preferably discharges against a side of the vessel opposite the solvent vapor line 10 to reduce the amount of fines carried overhead, if any. Since part of the tank 7 has a vapor phase the solvent from the cement after the rubber or polymer has been coagulated is removed overhead by the line 10 and passes to a suitable condensation system not shown and thereby permits the solvent to be recovered in the normal manner for re-use in the polymerization system with suitable well-known clean-up or pretreatment before the solvent is re-used. The crumb in the slurry in tank 7 is preferably contacted with a steam sparge to facilitate the complete volatilization of the solvent.

The crumb slurry in tank 7 while being stirred by the agitator 27 is withdrawn from the bottom of tank 7 by line 11 having valve 12 therein and passes to a pumping device such as the centrifugal pump 13 where the crumb within the water is pumped to a suitable crumb straining device such as that indicated by numeral 14. Where high through puts are desired a secondary stripper tank may be located in between tank 7 and the crumb straining device.

In the crumb screening device 14 the crumb drops on the screen and the water passes through the screen to be recirculated and re-used, if so desired (see line 28), or sent to the sewer (see valve 29 and line 30). The crumb from the screen 14 passes through a suitable drying device, preferably a water press 15 wherein the crumb is slightly compacted by the screw action of the water press and any free water is exuded through the openings of the water press to relieve the crumb of any essentially free or any adhered water. From the water press 15 the crumb passes preferably to a drying-extruder 16 where the crumb is subjected to suitable mechanical work to raise the temperature of the rubber above the point at which the water and any remaining solvent is volatilized to yield a dry rubber crumb as it leaves the extruder 16. The volatilized solvent preferably is sent to the solvent recovery section (not shown) to be condensed. It should be appreciated that instead of the extruder 16, a Banbury mill or any of the other means of drying the crumb may be used such as an air oven.

Referring again to the agitation-attrition-pumping device 4, it will be noted that just in front thereof a water-steam mixture is passed into it by line 17. This steam-water mixture preferably is formed by passing water at about 200°F. and steam at 5 to 150 pounds per square inch, or higher, through a water-steam mixer 18 and then it is passed from there by line 17 into the device 4 to achieve coagulation of the cement by volatilization of a sufficient amount of the solvent to effect crumb formation.

Referring more specifically to FIG. 2, it will be noted that the cement comes into the attrition-cavitation device by line 3 and that line 3 extends into the feed inlet 19 of the attrition-cavitation device 4 until it is in essential contact with the impeller 20, usually about one-fourth to one-half inch of clearance is desired. On the other hand, the steam-water mixture from the mixer 18 passes by line 17 into the throat 19 of the attrition-cavitation device 4 and thereby the steam and cement are dumped into the cavity formed as the impeller 20 rotates within the cavitation-attrition device 4.

The nature of the cavitation-attrition device 4 may more readily be understood by reference to FIG. 3, wherein numeral 21 indicates the base of the attrition-cavitation device and numeral 22 indicates the housing. Within the housing 22 is a horizontal shaft 23 having on one end thereof an impeller 20. It should be noted that the shaft 23 is mounted rotatably within the housing 22 and is driven by the motor 5. Upon rotation of the motor 5 the shaft 23 turns and thus moves the impeller 20 through the cavity 24 of the attrition device. It should be noted that the attrition device 4 has an inlet 19 through which the steam, water and cement is fed into the cavity of the device and an outlet 6 through which the coagulated polymer or crumb is fed from the cavity 24 via line 9 to the top of tank 7.

It should be noted that the impeller 20 is not mounted in a normal T manner in regard to the alignment of the shaft 23 but is mounted on the shaft at an angle, usually about 30° to 45° relative to the alignment of the shaft 23. Thus, when the impeller or plane member 20 is rotated it tends to squeeze or sweep through the entire cavity 24 of this attrition device to create rapid oscillations in said cavity that pumps the slurry out by outlet 6. Also, it should be noted that the impeller 20 can be in effect a segment through a sphere. In one embodiment (not shown) the impeller 20 fits within the cavity that is spheroidal in shape and the poles of the segment are cut away making a disc with square ends and spherical curved edges. However, in this instance where the cavity is essentially cylindrical in shape, as shown in FIG. 3, the plane member or impeller 20 may be considered as being a segment or plane through a cylinder, thus being rectangular in shape, and having the curvature of the cylinder forming the cavity at two edges and straight parallel ends at the portions perpendicular to the ends attached to the shaft 23. A more detailed description of this device is shown in U.S. Pat. No. 3,329,354, wherein the device is described as a rotary pump for the displacement and mastication of fluent materials, comprising a pump housing forming a pump chamber constituting a figure of revolution centered upon an axis, said housing having a generally axial inlet for said material and at least one generally radial outlet opening into said chamber at an inclination to said axis and rotatable therearound with opposite peripheral edges of said disk sweeping along the wall of said chamber, said peripheral edges being each provided with a plurality of arrays of teeth lying in respective planes parallel to said disk.

Referring again to FIG. 3 it will be noted that the cavity 24 of the device 4 has a stator 25 that has a series of ridges that are essentially gear shape in nature and a series of blocks or depressions. Also, this construction in the pulp industry is sometimes referred to as defibering equipment with the serrations or teeth in the liner being in close cutting or tearing relationship with the rotor or impeller.

The preferred type of defibration apparatus or equipment to be used as the grinding and pumping device is the Gorator sold by Dorr-Oliver, Incorporated, or the Eili Milling Pump sold by Carbone Corporation. It should be noted that it is not essential that the impeller be of the type described, namely a solid plate. It may be a series of segments of a circle having teeth that mesh with the teeth or gears of the stator to produce a cutting or grinding as well as pumping action. Preferably, the defibration apparatus or slurry pump produces an oscillating chamber to receive cement and water/steam mixture to aid their being charged to the pump.

Thus, when the impeller 20 is rotated it brings the teeth or gear members of impeller 20 into cutting relationship with the teeth members of the stator 25 and thus any crumb will tend to be grounded or reduced in size until the crumb can pass between the openings or grooves within the stator 25. Also, in a preferred embodiment the impeller 20 has on the edges thereof a series of notches or teeth that have been placed thereon to correspond with the grooves within the stator 25. Thus, the rotation of the impeller 20 achieves the shearing action as the impeller 20 passes over the stator 25 grooves.

A further benefit of this invention is achieved in that the operation as heretofore described results not only in the particle size of the crumb being adjusted downward from large size but the fines which heretofore has given appreciable difficulty is reduced or tends to be compacted or otherwise incorporated together to increase the size of the crumb to give a crumb of more uniform size, namely, the crumb that has a controlled or reduced amount of fines and essentially no large particles. Thus, the drying time of the crumb is reduced and also the amount of solvent lost is reduced to give an improvement not only in steam efficiency but in the amount of solvent that is recovered with a crumb that is more readily dried and handled in the more conventional manner associated with the recovery of rubber from solvent polymer systems.

Especially is the solvent loss reduced where the pressure in the solvent vapor line is less than 5 pounds per square inch gauge rather than the usual 15-20 pounds per square inch gauge.

The polymer solutions or cements useful in this invention are well known and generally are prepared by the solvent polymerization of an olefinic monomer of either the alpha-olefins or the diolefin type or their comonomers, said olefins having from about 2-20 carbon atoms. Representative members of these olefins are ethylene, propylene, the butylenes and the higher aliphatic olefins, viz. 5-12 carbon atoms, and the diolefins such as butadiene, isoprene, 2-ethyl butadiene, 1,3-pentadiene, or those having 4 to 10 carbon atoms. Olefins that contain atoms other than carbon and hydrogen may also be utilized to produce cements whose polymer may be recovered in accordance with this invention. Representative of these olefins are acrylonitrile, the esters of acrylic and methacrylic acid, usually lower esters having alkyl groups of 1 to 10 carbon atoms, vinyl chloride and vinylidene chloride, vinyl alkyl ethers, etc.

Normally, these olefins are polymerized using well-known catalysts such as the transition metal salts in combination with the alkyl metals of aluminum and related low molecular weight metals.

The nature of this invention may be more readily understood by reference to the following examples wherein all parts are by weight unless otherwise designated.

EXAMPLE I

A high cis polyisoprene produced in hexane and containing about 14 percent solids was utilized in a series of runs on the equipment of FIG. 1 wherein the device 4 was a Dorr-Oliver 4 × 6 Gorator, type GN, where the 4 represents the size of the outlet opening and the 6 indicates the size of the horizontal inlet opening to the Gorator. Also, it should be noted that this Gorator had attached thereto the mixing device shown in FIG. 2 to permit the addition of the cement and water/steam mixture separately to the inlet opening of the Gorator and yet be mixed essentially in contact with the impeller 20.

The high cis polyisoprene cement was fed to the Gorator at 60 pounds per square inch pressure and the amount pumped varied from 0.8 to 20.9 gallons per minute. The water utilized in this mixture contained a wetting agent, Tamol 731 at 0.5 parts per hundred rubber level and was fed to the steam/water mixture at about 200°F. where it was contacted with steam at 70 pounds per square inch. The results of these experimental runs are set forth in Table 1 under Runs 1 through 5. It should be noted that the crumb had a very uniform size, low organic volatile content. Also, a relatively lower power and steam requirement was required to achieve the drying of this polyisoprene polymer designated in Table 1 at Natsyn 200.

In another example a high cis polybutadiene cement designated as Budene 501 was charged through the Gorator and the results of this experimental run is shown under Run 6 in Table 1. It should be noted that high cis polybutadiene forms smaller crumb particles than does a high cis polyisoprene under the same crumbing conditions:

Table 1

Operating Conditions for Gorator Runs
Temperature of water feeding the Gorator = 200°F.
Temperature of the Gorator effluent = 200°F.

| Run Number | 1 | 2 | 3 | 4 | 5 | 6 |
|---|---|---|---|---|---|---|
| Polymer type | Natsyn 200 | | | | | Budene 501 |
| Cement solids, % | 14.0 | | | | | 15.4 |
| Cement rate, gpm | 0.8 | 1.0 | 17.4 | 20.9 | 15.3 | 10.1 |
| Water rate, gpm | 12 | 12 | 30 | 32 | 30 | 32 |
| Crumb, % volatiles | 29.0 | 29.0 | 30.5 | 43.1 | 49.4 | 44.9 |
| Crumb concentration in the Gorator, %, dry rubber basis | 0.6 | 0.75 | 4.7 | 5.7 | 4.5 | 4.0 |
| Organic volatiles in crumb, % | | | 0.70 | 0.75 | 0.23 | 12.8* |
| Crumb diameter, inches | ¼ | ¼ | ½ | ¼ | ½ | ⅛ |

* When the residence time in vessel 7 was increased, the organic volatiles were reduced to lower values, about 0.5%.

It should be noted that some polymers have an inherent tendency to produce finer crumb than others. Thus, with these solvent dispersions it may be beneficial to reduce the speed of the grinding pumping device and to increase the clearance from about 0.2 to 0.3 or slightly more between the serrations on the impeller and the stator. Alternately, with those polymers that inherently tend to produce fine crumb, it is desirable that instead of the screen being a vibrating screen, that it be a screen of the longitudinal slot type wherein the crumb slides off the screening device into the press.

While certain representative embodiments and details have been shown for the purpose of illustrating the invention, it will be apparent to those skilled in this art that various changes and modifications may be made therein without departing from the spirit or scope of the invention.

What is claimed is:

1. In a method for obtaining a polymer from a solvent dispersion of said polymer, the steps of feeding a water/steam mixture and said solvent dispersion into a cavity of a grinding pumping device to form an admixture, moving said admixture by the rotation of an impeller in the cavity of said device to size the polymer as a crumb and onto a separation zone, separating the solvent as a vapor in the separating zone before separating the crumb from the crumb-water mixture.

2. The method of claim 1 wherein the crumb is separated from the crumb-water mixture by passing the crumb-water mixture over a screen to separate the crumb from the water and the crumb is dried to obtain a dry polymer.

* * * * *